United States Patent

Jomoto et al.

[11] Patent Number: 5,830,424
[45] Date of Patent: Nov. 3, 1998

[54] METHOD OF EXTRACTING FLUORINE FROM MINERALS OR MINERAL SPECIES

[75] Inventors: Kimitaka Jomoto, Reno, Nev.; Terence Charles Hughes, North Carlton, Australia

[73] Assignee: The Broken Hill Proprietary Company Limited, Melbourne, Australia

[21] Appl. No.: 571,923

[22] PCT Filed: Jul. 4, 1994

[86] PCT No.: PCT/AU94/00374

§ 371 Date: May 31, 1996

§ 102(e) Date: May 31, 1996

[87] PCT Pub. No.: WO95/01460

PCT Pub. Date: Jan. 12, 1995

[30] Foreign Application Priority Data

Jul. 2, 1993 [AU] Australia .................................. PL9745

[51] Int. Cl.[6] .................................. C01B 9/08; C01B 35/06
[52] U.S. Cl. .................................. 423/293; 423/489; 423/658.5
[58] Field of Search .................................. 423/489, 658.5, 423/293

[56] References Cited

U.S. PATENT DOCUMENTS

| | | | |
|---|---|---|---|
| 3,928,019 | 12/1975 | Marsh . | |
| 4,444,740 | 4/1984 | Snodgrass et al. | 423/489 |
| 4,597,953 | 7/1986 | Bush | 423/132 |
| 5,352,419 | 10/1994 | Jenkins | 423/489 |

FOREIGN PATENT DOCUMENTS

| | | | |
|---|---|---|---|
| 2374484 | 7/1984 | Australia . | |
| 1984192 | 7/1992 | Australia . | |
| 1259792 | 8/1992 | Australia . | |
| 584964 | 9/1933 | Germany . | |
| 15976 | 2/1980 | Japan | 423/489 |
| 992427 | 1/1983 | Russian Federation | 423/489 |
| 487021 | 6/1938 | United Kingdom . | |
| 647216 | 6/1950 | United Kingdom . | |

*Primary Examiner*—Wayne Langel
*Attorney, Agent, or Firm*—Kerkam, Stowell, Kondracki & Clarke; Dennis P. Clarke

[57] ABSTRACT

A method of extracting a mineral or mineral species comprising contacting the mineral or mineral species with a leachate solution which contains metal or metalloid ions capable of forming soluble fluoro-complexes of high bond strength with fluorine in the mineral or mineral species.

20 Claims, 1 Drawing Sheet

METHOD OF EXTRACTING FLUORINE FROM MINERALS OR MINERAL SPECIES

The present invention relates to a method of extracting fluorine from minerals or mineral species.

The term "mineral species" is understood herein to mean any mineral-containing product formed by processing mineral ores, for example, mineral concentrates for pyrometallurgical processes such as smelting.

The present invention is not mineral specific and applies to all fluorine containing minerals or mineral species.

Fluorine is present in rocks in a range of minerals; for instance as discrete mineral grains, such as fluorite ($CaF_2$) and fluorapatite ($Ca_5[PO_4]_3$ FOH), or as sub-grains, veins or inclusions, often with a wide range of compositions. Fluorine can also occur dispersed throughout mineral species as a replacement ion or displacement anion, for example, by substitution for chloride or hydroxyl ions. Fluorine can also occur as complex ions such as $(FeF_6)^{3-}$ or $(AlF_6)^{3-}$ in some mineral assemblages, usually at low concentrations.

There is a need to reduce fluorine levels to less than 100 ppm (0.01 wt. %) in mineral concentrates such as lead, zinc and copper sulfides prior to smelting because at levels above 100 ppm fluorine may interfere with the smelting process and result in a cost penalty.

An object of the present invention is to provide a method of extracting fluorine from minerals or mineral species, such as mineral concentrates, to reduce the fluorine levels to less than 100 ppm.

According to the present invention, there is provided a method of extracting fluorine from a mineral or mineral species comprising contacting the mineral or mineral species with a leachate solution which contains metal or metalloid ions capable of forming soluble fluoro-complexes of high bond strength with fluorine in the mineral or mineral species.

The term "metalloid" is understood to mean elements that exhibit properties that are characteristic properties of metals and properties that are characteristic properties of non-metals.

The present invention is based on the realization that the bond strength of some fluoro-complexes can be several orders of magnitude above the bond strength of fluorine in minerals, for example Ca—F in fluorite, and therefore can provide the chemical driving force for extracting fluorine from minerals. As a consequence, providing there are no kinetic, chemical, thermodynamic or solubility restrictions to the formation of fluoro-complexes, contact between a fluorine-containing mineral or mineral species and a suitable metal-containing or metalloid-containing leachate solution will result in the formation of a soluble fluoro-complex and thereby the removal of fluorine from the mineral or mineral species.

Figure 1:
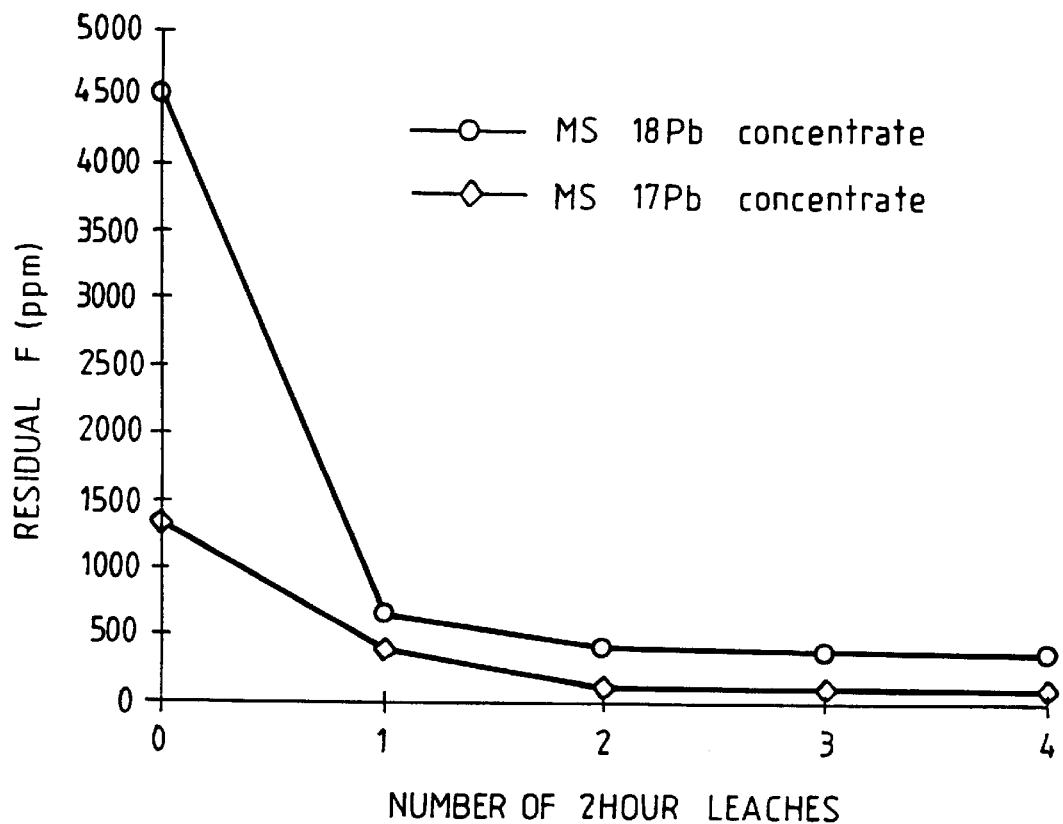
FIG. 1 shows the results obtained from multileach trials on fluorine removal from lead and zinc concentrates according to the present invention.

A typical extraction reaction for a metal-containing leachate solution is as follows:

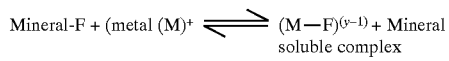

Mineral-F + (metal (M)$^+$) $\rightleftharpoons$ (M—F)$^{(y-1)}$ + Mineral soluble complex It is preferred that the method further comprises repeating the step of contacting the mineral or mineral species with the leachate solution.

It is preferred that the method further comprises separating the leachate solution from the mineral or mineral species.

It is preferred that the method further comprises removing the fluoride complex ions from the leachate solution by precipitation, absorption, displacement, ion exchange, ion exclusion, solvent extraction, or distillation.

Alternatively, it is preferred that the method further comprises decomposing the soluble fluoro-complexes in the leachate solution to separate the metal or metalloid ions and the fluoride ions.

It is preferred particularly that the method comprises recycling the metal or metalloid ions.

It is preferred particularly that the method comprises decomposing the soluble fluoro-complexes in the leachate solution by adjusting the acidity (pH) and/or oxidation potential (Eh) of the leachate solution.

For example, the soluble fluoro-complexes may be decomposed by adjusting the acidity by contacting the leachate solution with lime, limestone, or other alkaline species to raise the pH above 6.

Alternatively, the soluble fluoro-complexes may be decomposed by adjusting the oxidation potential by contacting the leachate solution with pyrites, carbonaceous material, or other oxidizing or reducing species.

It is preferred that the method further comprises removing the fluoride ions from the leachate solution by precipitation, absorption, displacement, ion exchange, ion exclusion, solvent extraction, or distillation.

It is preferred that the method further comprises, after separating the mineral or mineral species and the leachate solution, washing the mineral or mineral species with an acidic solution to remove any high stability fluoro complexes, such as iron-fluoride complexes or manganese-fluoride complexes.

It is preferred that the acidic wash solution has a pH of 1.0 to 3.0.

It is preferred that the acidic wash solution has a low oxidation potential.

It is preferred particularly that the oxidation potential be +0.1 to −0.2 volts.

It is preferred that the method further comprises, prior to contacting the mineral or mineral species with the leachate solution, crushing or grinding the mineral or mineral species into a particulate form having extensive micro or macro fractures so that the particles are essentially porous and therefore the mineral or mineral species are well exposed to the leachate solution.

It is preferred particularly that 80% of the particles of mineral or mineral species pass a 75 microns screen or a finer screen.

It is more particularly preferred that 80% of the particles of mineral or mineral species pass a 35 microns screen.

It is preferred that the metal or metalloid ions be selected typically but not exclusively from the group comprising aluminum, boron, beryllium, uranium, titanium, and tungsten.

It is preferred particularly that the metal or metalloid ions be aluminum.

With aluminum the important chemical reactions are possibly, but not exclusively:

$$\text{Mineral-F} \xrightleftharpoons{\text{Dilute acid}} \text{Mineral} + \text{HF} \xrightleftharpoons{\text{Dilute acid}} \text{H}^+ + \text{F}^-$$

$$Al^{3+} + F^- \rightleftharpoons (AlF)^{2+} \text{ (soluble)}$$

$$(AlF)^{2+} + F^- \rightleftharpoons (AlF_2)^+ \text{ (soluble)}$$

Other AlF species are sparingly soluble or are insoluble, e.g., $AlF_3$, $Na_3AlF_6$ are insoluble:

$$AlF_3 + F^- \rightleftharpoons (AlF_4)^- \text{ (sparingly soluble)}$$

$$(AlF_4) + F^- \rightleftharpoons (AlF_5)^{2-} \text{ (sparingly soluble)}$$

Overall the reaction is:

$$Al^{3+} + \text{Mineral-F} \xrightleftharpoons{H+} (AlF)^{n\pm} + \text{Mineral}$$

wherein "n" is an integer.

It is noted that generally the anions present in the leachate solution are of minor importance and, for example, sulfate, chloride, or other soluble anions may be used. It is preferable not to use anions which form soluble complexes with the metal used to form the soluble fluoro-complex to avoid competition which could interfere with the rate of fluorine extraction by reducing the availability of the metal as a fluorine complexing agent.

In situations where the anion is a sulfate and the acid is sulfuric acid, it is preferred that the leachate solution has a pH of 3.0 to 4.3 because aluminum is soluble as aluminum sulphate and fluorine can exist in the free ionic $F^-$ state.

It is noted that at lower pH values, the equilibrium changes to favor the combination of fluoride ions with hydrogen ions to form undissociated hydrogen fluoride. This change reduces the availability of fluoride ions and may slow the rate of fluorine extraction from minerals.

It is also noted that the fluorine removal reaction can be carried out with anionic systems other than sulfate and sulfuric acid. For instance, chloride and hydrogen chloride can be used, but pH solutions lower than 3.0 to 4.3 will be required to avoid the loss of available aluminum by hydrolysis. These lower pH solutions (pH 1 to 2) may also cause the fluoride equilibrium to move toward hydrogen fluoride and the chloride will compete with fluoride in the combination reaction with aluminum. Thus, the efficiency of the fluorine removal reaction will be reduced.

It is preferred that the molecular ratio of Al:F be adjusted to minimize the formation of the insoluble or sparingly soluble $AlF_3$, $(AlF_4)^-$, $(AlF_5)^{2-}$ and $(AlF_6)^{3-}$ anions.

It is preferred particularly that the molecular ratio of Al:F be 1:1 to 5:1. This should avoid the formation of Al—F precipitates which might slow the fluorine extraction reactions due to the formation of an impermeable surface deposit.

It is more particularly preferred that the molecular ratio of Al:F be 2:1 to 5:1.

It is noted that the formation of the sparingly soluble $(AlF_4)^-$ and $(AlF_5)^{2-}$ species by disproportionation of $(AlF)^{2+}$ and $(AlF_2)^+$ may be used as a means of removing fluorine from the leachate solutions. At pH values above 5.5, the Al will tend to precipitate which will change the stoichiometry towards the less soluble $(AlF_4)^-$ and $(AlF_5)^{2-}$ species. This effect may be used to remove soluble fluoride from the leachate solution prior to recycling the leachate solution. By the addition of potassium or calcium ions, it may be possible to precipitate insoluble higher AlF salts. The need to minimize leachate solution losses in a large scale leaching operation is very important for overall plant water management.

It is noted that fluorine is detectable by $F^{19}$ Nuclear Magnetic Resonance (F-NMR). This technique can be used to monitor the progress of the fluorine removal reaction. F-NMR can be used to measure soluble fluorine in aqueous solutions and can distinguish between the species, F, HF and metal-F in complexes with a sensitivity down to at least 0.01% F. Therefore, F-NMR can be used to study the rate of fluoro complex formation and can also be used to process control in plate operation for on-line monitoring.

In principle, solid-state F-NMR can also be used to investigate the fluorine mineralogy in rocks and minerals, although in this case the sensitivity and chemical resolution may limit the usefulness of the technique.

EXAMPLE 1

An example of the method of the invention is the removal of fluorine from a central Queensland lead-zinc ore using an acidified solution of aluminum sulfate.

In an experiment an amount of 25 gms of crushed ore containing 2.1% F was contacted in a stirred vessel with aluminum sulfate (20 gms) solution adjusted to pH 3 to 4.2 with dilute sulfuric acid. After stirring for about two hours at 20° to 22° C. and pH 3 to 4.2, the mixture was filtered; the residue was washed (dilute $H_2SO_4$), dried and analyzed for total fluorine by X-ray fluorescence (XRF). The fluorine level was found to have fallen to 0.15%. The leach solution was analyzed for soluble Pb, Zn and Fe and the levels of these metals were less than 20 ppm.

The residue from the leaching experiment was treated with 10 gms of aluminum sulfate solution (pH 3 to 4.2) and the fluorine level was further reduced to about 0.02% F. This shows that very low levels of fluorine can be achieved in oxide and sulfide mineral materials by chemical leaching, particularly if multistage or counter current techniques are applied.

Further leaching experiments at lower pH values (pH 1.5, 2 and 2.5) failed to show major increases in fluorine extraction. However, increasing both the temperature and the amount of available aluminum and raising the particle to particle collision rate did have a beneficial effect. Also, reducing the mineral particle size to less than 25 microns using a rolls crusher or rod mill or fine grinding equipment such as ball mills or disc pulverizers enabled the leach time to be shortened while obtaining the same fluorine removal efficiency.

EXAMPLE 2

A series of experiments were carried out to investigate the preferred parameters for fluorine removal from lead and zinc concentrates obtained from the central Queensland lead-zinc ore referred to in Example 1 selected from the following experimental conditions.

| | |
|---|---|
| Particle size range | ideally 90% < 37 microns |
| Leach reagent | $Al_2(SO_4)_3$.solution |
| Al:F ratio | at least 1:1 |
| Solid:liquid ratio | 20 to 60% solids |
| pH | 2.8 to 3.8 |

-continued

| | |
|---|---|
| pH control | by $H_2SO_4$ or NaOH |
| Washing of residue | by dilute $H_2SO_4$ |
| Number of leaching stages | 1, 2 or 3 |
| Agitation | continuous or shear mixing |
| Temperature | 25° C. to 60° C. |

The best results obtained in the experimental work and the parameters that produce those results are set out in Table 1 below.

TABLE 1

| Leach conditions | Pb concentrate Residual F (ppm) | Zn concentrate Residual F (ppm) |
|---|---|---|
| nil | 4550 | 1890 |
| 4 × 2 hr leaches at 50° C. and Al:F ratio of 2:1 | 370 | 37 |
| 2 × 2 hr leaches at 50° C. and Al:F ratio of 2:1 | 410 | 50 |
| grinding and 2 × 2 hr leaches at 50° C. and Al:F of 2:1 | 222 | |

EXAMPLE 3

A series of experiments were carried out to investigate the effect of Al:F ratio and single and multiple leaching on fluorine removal from lead and zinc concentrates obtained from the central Queensland lead-zinc ore referred to in previous examples.

The experimental work was carried out with Al:F ratios of 5:1 and 2:1 and single and multiple leaching with each leach step being of 2 hours duration.

The results of the experimental work are set out in Table 2 below.

TABLE 2

Effect of single and multiple leaching at Al:F ratios of 5:1 and 2:1

| Leaching conditions* | Pb concentrate Residual F (ppm) | Zn concentrate Residual F (ppm) |
|---|---|---|
| nil | 1329 | 1890 |
| Al:F = 5:1 | | |
| 1 × 2 hr | 151 | 175 |
| 2 × 2 hr | 122 | 51 |
| Al:F = 2:1 | | |
| 1 × 2 hr | 393 | 252 |
| 2 × 2 hr | 119 | 50 |

*at 50° C. and 20% solids load

Table 2 shows that the higher Al:F ratio of 5:1 improved leaching markedly for both Pb and Zn concentrates at the 1×2 hr leach, although this was not as effective as 2×2 hr leaches.

Table 2 also shows that similar results were obtained for the 2×2 hr leaches when either an Al:F ratio of 5:1 or 2:1 was used. This suggests that similar fluorine leaching limits have been reached.

EXAMPLE 4

A series of experiments were carried out to investigate further the effect of multiple leaching on fluorine removal from lead and zinc concentrates obtained from the central Queensland lead-zinc ore referred to in previous examples.

Multiple leaching experiments on the Pb and Zn concentrates were performed (2 hr per leach) at 50° C. with a starting Al:F ratio of 2:1. The Pb and Zn concentrates were exposed to up to four leach steps at 2 hr per leach. Between each step, the solid residue was washed and releached with fresh aluminum sulfate solution. The washings from each run were combined and analyzed in total. The fluorine remaining in the leached residue was measured.

The results obtained from the multileach trials are summarized in FIG. 1 and Table 3 below.

With reference to FIG. 1 and Table 3, the fluorine levels in both concentrates decreased rapidly in the first two leaches and further leaching after the second leach did not have a significant effect.

TABLE 3

Residual fluorine levels achieved in multiple leaching trials

| | Number of 2 hr leaches | Residual F (ppm) |
|---|---|---|
| Pb concentrate | nil | 4550 |
| | 1 leach | 661 |
| | 2 leaches | 410 |
| | 3 leaches | 380 |
| | 4 leaches | 370 |
| | 1 × 24 hr leach | 761, 721 |
| Zn concentrate | nil | 1890 |
| | 1 leach | 252 |
| | 2 leaches | 50 |
| | 3 leaches | 41 |
| | 4 leaches | 37 |

EXAMPLE 5

A series of experiments were carried out to investigate the effect of particle size on fluorine removal from lead and zinc concentrates obtained from the central Queensland lead-zinc ore referred to in previous examples.

Portions of Pb concentrate were ground in a ring grinder for time intervals of 20 seconds, 60 seconds, and 10 minutes. Subsamples were taken and the particle size distribution determined by laser sizing. Various sized samples were subsequently leached at 50° C. using an Al:F ratio of 2:1 for 2×2 hr leach steps. The results obtained are shown in Table 4.

With reference to Table 4, when compared with the un-ground sample, grinding was found to improve fluorine extraction significantly, thus yielding a residue with a minimum 222 ppm fluorine compared with 344 ppm when no grinding was used.

TABLE 4

Effect of Pb concentrate particle size on fluorine extraction after 2 × 2 hr leaches at 50° C.

| Sample/grinding time | 10% | 50% | 90% | Mean size | Residual F (ppm) |
|---|---|---|---|---|---|
| Pb concentrate/ no grinding | <2.8µ | <14.9µ | <45.5µ | 20.6µ | 344 |
| Pb concentrate/ 20 sec grind | <0.6µ | <6.9µ | <28.4µ | 11.4µ | 318 |
| Pb concentrate/ 60 sec grind | <0.4µ | <5.2µ | <24.8µ | 9.6µ | 285 |
| Pb concentrate/ 10 min grind | <0.3µ | <2.3µ | <12.4µ | 4.5µ | 222 |

Many modifications may be made to the preferred method of the invention described above without departing from the spirit and scope of the invention.

We claim:

1. A method of extracting fluorine from a mineral or mineral species comprising contacting the mineral or mineral species with a leachate solution which contains metal or metalloid ions so as to form soluble fluoro-complexes with fluorine in the mineral or mineral species.

2. The method defined in claim 1 further comprising repeating the step of contacting the mineral or mineral species with the leachate solution.

3. The method defined in claim 2 further comprising separating the leachate solution from the mineral or mineral species.

4. The method defined in claim 3 further comprising removing the fluoride complex ions from the leachate solution by precipitation, absorption, displacement, ion exchange, ion exclusion, solvent extraction, or distillation.

5. The method defined in claim 3 further comprising decomposing the soluble fluoro-complexes in the leachate solution to separate the metal or metalloid ions and the fluoride ions.

6. The method defined in claim 5 further comprising recycling the metal or metalloid ions.

7. The method defined in claim 6 comprising decomposing the soluble fluoro-complexes in the leachate solution by adjusting the acidity (pH) and/or oxidation potential (Eh) of the leachate solution.

8. The method defined in claim 7 comprising adjusting the acidity by contacting the leachate solution with lime, limestone, or other alkaline species to raise the pH above 6.

9. The method defined in claim 7 comprising adjusting the oxidation potential by contacting the leachate solution with pyrites, carbonaceous material, or other oxidizing or reducing species.

10. The method defined in claim 9 further comprising removing the fluoride ions from the leachate solution by precipitation, absorption, displacement, ion exchange, ion exclusion, solvent extraction, or distillation.

11. The method defined in claim 4 further comprising, after separating the mineral or mineral species and the leachate solution, washing the mineral or mineral species with an acidic solution to remove any remaining fluoro complexes.

12. The method defined in claim 11 wherein the acidic wash solution has a pH of 1.0 to 3.0.

13. The method defined in claim 12 further comprising prior to contacting the mineral or mineral species with the leachate solution, crushing or grinding the mineral or mineral species into a particulate form having micro or macro fractures so that the particles are essentially porous and therefore the mineral or mineral species are exposed to the leachate solution.

14. The method defined in claim 13, wherein 80% of the particles of mineral or mineral species pass a 75 microns screen or a finer screen.

15. The method defined in claim 14, wherein the metal or metalloid ions are selected from the group consisting of aluminum, boron, beryllium, uranium, titanium, and tungsten.

16. The method defined in claim 15, wherein the metal is aluminum.

17. The method defined in claim 16, wherein the leachate solution has a pH of 3.0 to 4.3.

18. The method defined in claim 17, wherein the molecular ratio of Al:F is selected to minimize, the formation of insoluble or sparingly soluble $AlF_3$, $(AlF_4)^-$, $(AlF_5)^{2-}$ and $(AlF_6)^{3-}$ anions.

19. The method defined in claim 18, wherein the molecular ratio of Al:F is 1:1 to 5:1.

20. The method defined in claim 19, wherein the molecular ratio of Al:F is 2:1 to 5:1.

* * * * *